United States Patent
Cornic et al.

(10) Patent No.: US 11,686,812 B2
(45) Date of Patent: Jun. 27, 2023

(54) METHOD FOR CONFUSING THE ELECTRONIC SIGNATURE TRANSMITTED BY A RADAR, AND TRANSMISSION/RECEPTION DEVICE SUITABLE FOR IMPLEMENTING SAME

(71) Applicant: THALES, Courbevoie (FR)

(72) Inventors: Pascal Cornic, Brest (FR); Patrick Garrec, Merignac (FR); Nicolas Porez, Merignac (FR)

(73) Assignee: THALES, Courbevoie (FR)

( * ) Notice: Subject to any disclaimer, the term of this patent is extended or adjusted under 35 U.S.C. 154(b) by 579 days.

(21) Appl. No.: 16/703,810

(22) Filed: Dec. 4, 2019

(65) Prior Publication Data
US 2020/0182966 A1 Jun. 11, 2020

(30) Foreign Application Priority Data

Dec. 11, 2018 (FR) ........................ 1872651

(51) Int. Cl.
*G01S 7/38* (2006.01)
*G01S 7/02* (2006.01)
*G01S 7/36* (2006.01)
*G01S 13/00* (2006.01)

(52) U.S. Cl.
CPC ............... *G01S 7/38* (2013.01); *G01S 7/024* (2013.01); *G01S 7/36* (2013.01)

(58) Field of Classification Search
CPC .................................. G01S 7/38; G01S 13/00
See application file for complete search history.

(56) References Cited

U.S. PATENT DOCUMENTS

| 4,035,797 A | * | 7/1977 | Nagy ...................... G01S 7/025 342/361 |
| 4,329,687 A | * | 5/1982 | Kloevekorn ............ G01S 7/026 342/136 |
| 4,472,717 A | | 9/1984 | Eaves et al. |
| 5,592,177 A | * | 1/1997 | Barrett ..................... H04B 7/10 342/361 |
| 5,982,329 A | * | 11/1999 | Pittman .................... H01Q 1/38 343/754 |

(Continued)

FOREIGN PATENT DOCUMENTS

| JP | 61135247 A | * | 6/1986 | ............... H04L 7/00 |
| WO | 2017/021307 A1 | | 2/2017 | |

OTHER PUBLICATIONS

Q. Xiaolin, J. Tao, Q. Xiaohui, Z. Min, Y. Shuqing and Z. Qunxing, "Anti-Millimeter Wave Polarization Agile Active Jamming," 2007 International Conference on Microwave and Millimeter Wave Technology, Guilin, China, 2007, pp. 1-4, doi: 10.1109/ICMMT.2007.381515. (Year: 2007).*

(Continued)

*Primary Examiner* — Bernarr E Gregory
(74) *Attorney, Agent, or Firm* — BakerHostetler

(57) ABSTRACT

A method for confusing the electronic signature of a signal transmitted by a radar, includes the generation by the radar of at least one pulse, wherein the method comprises a step of modulation, in the pulse, of the polarization of the transmitted signal, according to two orthogonal or opposite polarizations, the modulation of the polarization being performed according to a predetermined modulation code.

9 Claims, 5 Drawing Sheets

(56) References Cited

U.S. PATENT DOCUMENTS

| | | | | |
|---|---|---|---|---|
| 6,121,920 | A * | 9/2000 | Barrett | G01S 7/024 |
| | | | | 342/22 |
| 6,608,587 | B1 * | 8/2003 | Sparrow | G01S 7/024 |
| | | | | 342/13 |
| 6,781,540 | B1 * | 8/2004 | MacKey | G01S 13/90 |
| | | | | 342/25 A |
| 9,270,359 | B2 * | 2/2016 | Asplund | H04B 7/10 |
| 10,868,609 | B1 * | 12/2020 | Kossin | H04B 7/10 |
| 2004/0264592 | A1 * | 12/2004 | Sibecas | H04B 7/10 |
| | | | | 375/267 |
| 2009/0103720 | A1 * | 4/2009 | Karayil Thekkoott Narayanan | .... |
| | | | | H04B 7/10 |
| | | | | 380/34 |
| 2015/0168540 | A1 * | 6/2015 | Morita | G01S 13/284 |
| | | | | 342/21 |
| 2016/0313445 | A1 * | 10/2016 | Bailey | G01S 7/4816 |
| 2017/0264023 | A1 * | 9/2017 | Vouzelaud | G01S 7/034 |
| 2018/0224536 | A1 * | 8/2018 | Wang | G01S 7/025 |

OTHER PUBLICATIONS

Tao, et al., "Anti-Full Polarization Active Jamming", ICIEA 2007, 2nd IEEE Conference on Industrial Electronics and Applications, pp. 2718-2722, 2007.

Anonymous, "Analysis of IPAR Filed performance", Microwave Conference, pp. 133-141, Sep. 3, 1983.

Jian, et al., "Polarization Changing Technique in Macrocosm and it's Application to Radar", Chinese Journal of Systems Engineering and Electronics, Second Academy Ministry of Aero-Space Industry, vol. 15, No. 4, pp. 447-452, Dec. 1, 2004.

* cited by examiner

METHOD FOR CONFUSING THE ELECTRONIC SIGNATURE TRANSMITTED BY A RADAR, AND TRANSMISSION/RECEPTION DEVICE SUITABLE FOR IMPLEMENTING SAME

CROSS-REFERENCE TO RELATED APPLICATIONS

This application claims priority to foreign French patent application No. FR 1872651, filed on Dec. 11, 2018, the disclosure of which is incorporated by reference in its entirety.

FIELD OF THE INVENTION

The invention relates to a method for confusing the electronic signature transmitted by a radar. It relates also to a transmission/reception device suitable for implementing the confusion method. It applies in particular to the field of electronic warfare.

BACKGROUND

In an electronic warfare context, the identification of the signals transmitted by the radars is of strategic importance. Thus, once detected and recognized by a listening system, a radar can be considered as a friend or an enemy, even as a threat, to be neutralized or not.

The systems for listening to signals transmitted by radars use, to identify the signals received, a certain number of measurements of parameters which characterize these signals. Typically, these parameters include notably the emission frequency, the pulse length, the repetition frequency, the antenna rotation period. The set of these parameters constitutes the electronic signature of a radar, also called waveform. From the estimation of these different parameters, it is then possible to determine the type of opposing radar, for example whether it is a ground radar, a maritime radar, an airborne radar, even the type of carrier. For that, the listening systems use specialized databases, which are loaded at the start of transmission, as a function of a place where they operate, and of the conditions of use, and which list a set of emitters, notably of the radars, with their associated parameters.

The capacity, for a radar, to impersonate equipment which does not correspond to its true identity (another type of radar, a civilian telecommunications transmitter, even noise), or to persuade that it is operating in an operating mode different from the effective operating mode (for example persuade that it is in standby mode while it is in tracking mode) gives it an advantage over its adversaries. This technique is commonly and indifferently referred to as confusion, deception, or even decoying.

Usually, a radar has few means for disguising its identity or masking the mode in which it is operating. Indeed, any significant modification of its waveform or of its antenna scanning would be reflected by a significant degradation of the operational performance levels, in terms of detection sensitivity, of discrimination and of location of the targets of interest. For example, it is difficult to change transmission frequency, within a range that is wide enough to deceive a listening system. It is also not possible to envisage modifying the pulse or repetition lengths of the radar because that would have an impact on its mode of operation.

The document "*Anti-Full Polarization Active Jamming*" (Jin Tao and al., ICIEA 2007, $2^{nd}$ IEEE Conference on Industrial Electronics and Applications, 2007), published on 1 May 2007, describes a polarization coding method, which performs a polarization modulation from one pulse to another.

SUMMARY OF THE INVENTION

The invention aims to provide a method for confusing the electronic signature transmitted by a radar, but which does not affect the operational performance levels of said radar.

A subject of the invention is therefore a method for confusing the electronic signature of a signal transmitted by a radar, comprising the generation by the radar of at least one pulse, characterized in that the method comprises a step of modulation, in the pulse, of the polarization of the transmitted signal, according to two orthogonal or opposite polarizations, the modulation of the polarization being performed according to a predetermined modulation code.

Advantageously, the modulation code alternately switches the polarization from left-hand circular to right-hand circular.

As a variant, the modulation code alternately switches the polarization from left-hand oblique linear to right-hand oblique linear.

Advantageously, the modulation code comprises, to within one moment, as many moments for both orthogonal or opposite polarizations.

Advantageously, the modulation code is a seven-moment Barker code.

Advantageously, the method comprises the generation of a plurality of pulses, the modulation code being temporally inverted from one pulse to the next.

The invention relates also to a transmission/reception device configured to implement the abovementioned confusion method, the transmission/reception device comprising a single reception channel suited to a rectilinear polarization corresponding to one of the two polarization components of the polarization of the transmitted signal.

The invention relates as a variant to a transmission/reception device configured to implement the above-mentioned confusion method, and comprising: a first reception channel suited to a first rectilinear polarization corresponding to a first polarization component of the polarization of the transmitted signal; and a second reception channel suited to a second rectilinear polarization corresponding to a second polarization component of the polarization of the transmitted signal; a correlator common to the first reception channel and to the second reception channel, and configured to perform a filtering suited to the modulation code.

Advantageously, the correlator comprises:
a first shift register composed of delay cells applied to the first reception channel, and a second shift register composed of delay cells applied to the second reception channel, the number of delay cells of each shift register being equal to the number N of moments of the modulation code;
a first series of N phase compensation cells, each phase compensation cell of the first series being connected to a delay cell of the first shift register, and configured to modulate a sample stored in the delay cell by a phase that is identical or conjugate relative to the phase of the moment of same rank of the modulation code applied to the first polarization component;
a second series of N phase compensation cells, each phase compensation cell of the second series being connected to a delay cell of the second shift register, and configured to modulate a sample stored in the delay cell by a phase that is identical or conjugate relative to the phase of the moment of same rank of the modulation code applied to the second polarization component;

a set of summers, each summer being coupled to a phase compensation cell of the first series and to a phase compensation cell of the second series of same rank; a convolution circuit, configured to convolute a signal from the summers with a temporal replica of the pulse of the transmitted signal.

The invention relates finally to an antenna comprising a plurality of abovementioned devices, the antenna being of the electronic scanning type.

BRIEF DESCRIPTION OF THE DRAWINGS

Other features, details and advantages of the invention will emerge on reading the description given with reference to the attached drawings given by way of example and which represent, respectively.

DETAILED DESCRIPTION

The inventors have been able to observe that the listening systems, for reasons of complexity and of cost, exhibit an antenna gain that differs according to the polarization of the waves received, which is reflected by a variable sensitivity according to that polarization. The listening systems available on the market are provided with an antenna matched to a particular polarization in which they are supposed to pick up the maximum possible polarization. For example, they can be matched to an oblique (left-hand or right-hand) or circular (left-hand or right-hand) polarization, in order to pick up, possibly with a loss of 3 dB, the vertical and horizontal polarizations. The listening systems are never matched to a purely vertical or purely horizontal polarization, because, in this case, they would be unable to detect anything at all when the transmission is done in a mismatched polarization.

Typically, it is common practice to use, in these systems, an antenna matched to the levorotatory (left-hand) or dextrorotatory (right-hand) circular polarization. By contrast, such an antenna is very ill-suited to the reception of a circular polarization opposite to the polarization for which it is matched. In such a configuration, the loss can reach 20 dB.

Likewise, it is common practice to use, in these systems, antennas matched to the left-hand or right-hand oblique polarization. The oblique polarization, namely inclined at 45° relative to the vertical and horizontal polarizations, is also called "slant" polarization. Such an antenna is indeed capable of receiving a horizontal or vertical polarization, with a loss of 3 dB, or an oblique polarization conforming to that for which it is matched, namely left-hand or right-hand. It is on the other hand very ill-suited to the reception of an oblique polarization orthogonal to that for which it is matched. In such a configuration, the loss can once again reach 20 dB.

The method and the device according to the invention are based on this observation.

Polarization-agile radars are particularly suited to implementing the method according to the invention. They are capable of emitting and receiving on demand, in all types of polarization, whether rectilinear, inclined or not, elliptical or circular, in right-hand or left-hand rotation. More particularly, the active-antenna radars, in which the elementary radiating elements have several excitation ports, are well suited to implementing the method according to the invention. In these radars, the electrical field is excited according to two orthogonal orientations, called Ex and Ey.

Figure 1:
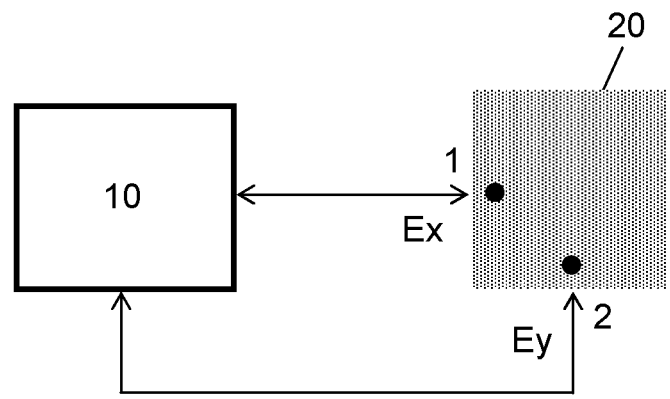
FIG. 1, an illustration of the supply of a radiating element according to two excitation ports.

In these conditions, the orientation of the electrical field and the polarization of the resulting wave can be controlled in any way with an individual control of the phase and of the amplitude of the excitation signals of the radiating elements. The radiating elements of the radar are connected individually or in groups to an active radiofrequency transmission reception module, called TR module, which controls the amplitude, the phase and the polarization of the signals transmitted and received according to two orthogonal polarizations. FIG. 1 schematically illustrates a radiating element 20 connected to an active radiofrequency transmission reception module 10, with the capacity to radiate and receive in all polarizations, by virtue of two orthogonal and independent electrical field excitation modes, Ex and Ey. The electrical field Ex is excited at the excitation port 1, and the field Ey is excited at the excitation port 2.

It is thus possible to obtain:
- a horizontal linear polarization, by performing an excitation by the port 1;
- a vertical linear polarization, by performing an excitation by the port 2;
- a polarization inclined by 45° to the right (right-hand oblique), by performing an excitation in phase and at the same amplitude by the ports 1 and 2;
- a polarization inclined by 45° to the left (left-hand oblique), by performing an excitation in phase opposition and at the same amplitude by the ports 1 and 2;
- a left-hand circular polarization, by performing an excitation of the same amplitude but phase-shifted by +90° between the ports 2 and 1;
- a right-hand circular polarization, by performing an excitation of the same amplitude but phase-shifted by −90° between the ports 2 and 1.

Figure 2:
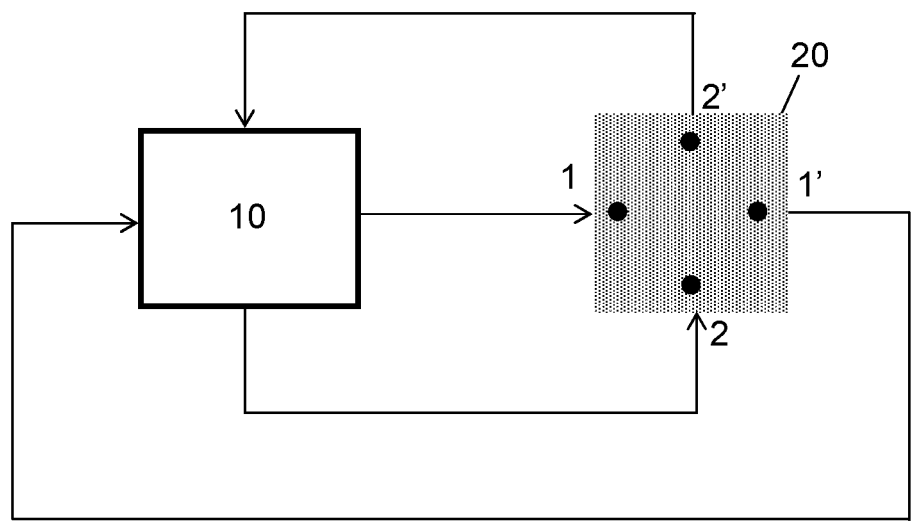
FIG. 2, an illustration of the supply of a radiating element according to two pairs of excitation ports.

An example of transmission/reception device that makes it possible to obtain a polarization agility is described in the patent application WO 2017/021307 A1, which discloses a radiating element excited not by two excitation ports, but by two pairs of excitation ports 1-1' and 2-2'. FIG. 2 schematically illustrates the supply by two pairs of excitation ports.

The two ports 1-1' and 2-2' of a pair are disposed symmetrically relative to a central point of the radiating element. That makes it possible to perform an excitation in differential mode.

Figure 3:
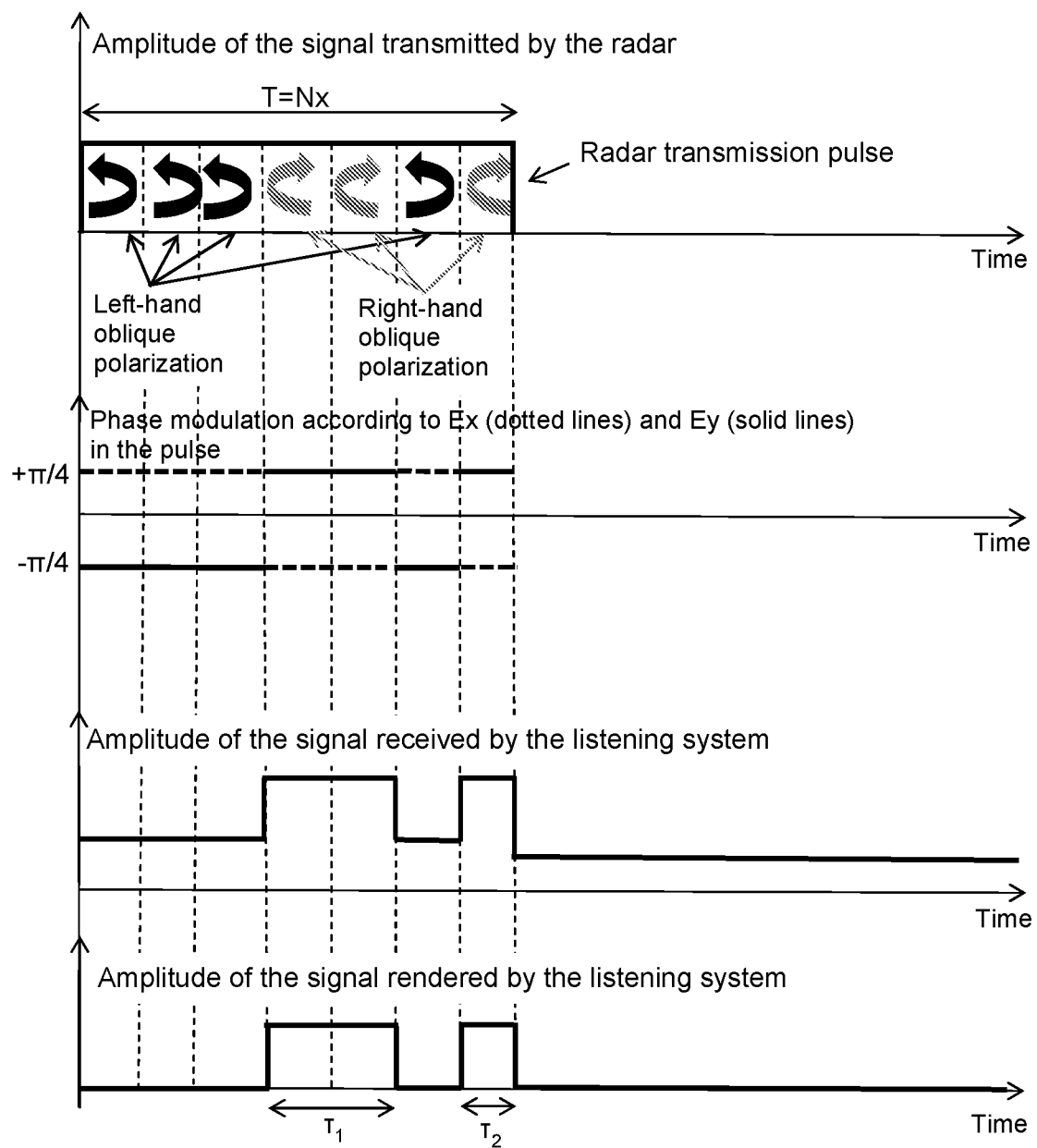
FIG. 3, four timing diagrams representing the amplitude of the envelope of the signal transmitted by the radar, the modulation of the phase of two orthogonal components of the electrical field, the amplitude of the envelope of the signal received by the listening device, and the amplitude of the envelope of the signal rendered by the listening device, when the method according to the invention alternates left-hand circular polarization and right-hand circular polarization.

In the timing diagram situated in FIG. 3 and representing the amplitude of the envelope of the signal transmitted by the radar, a single pulse is represented in the figure; in reality, the radar can generate a sequence comprising a plurality of pulses, without that modifying the method according to the invention. Within one and the same pulse, a modulation of the polarization of the transmitted signal is performed, according to two opposite polarizations, in this case left-hand circular and right-hand circular. "Opposite" polarizations are understood by the person skilled in the art to mean opposite directions of polarization: in left-hand circular polarization, the rotation takes place in the counter-clockwise direction, and in right-hand circular polarization, the rotation takes place in the clockwise direction.

The modulation of the polarization is performed according to a predetermined modulation code. The pulse of duration T can be broken down into N moments of duration $\tau$.

The polarization modulation is performed by varying the phase modulation of the rectilinear components Ex and Ey, generated in the radiating element at the corresponding excitation ports. In left-hand circular polarization, the rectilinear component Ex is for example phase-shifted by $+\pi/4$, and the rectilinear component Ey is inversely phase-shifted by $-\pi/4$. The phase-shift between two components is therefore at least 90°. In right-hand circular polarization, the rectilinear component Ex is phase-shifted by $-\pi/4$, and the rectilinear component Ey is phase-shifted by $+\pi/4$. The phase-shift between the two components is therefore at least $-90°$.

The timing diagram situated in FIG. 3 and representing the amplitude of the envelope of the signal received by the listening system shows a matching of the listening system for the right-hand circular polarization, and a mismatching for the left-hand circular polarization. Thus, for the first three moments, and for the sixth moment, the amplitude of the received signal is greatly reduced. For the fourth, fifth and seventh moments, the amplitude of the signal is in accordance with the expected amplitude levels. The listening system therefore considers to be noise, due for example to reflections from the outside environment, all the signals adjacent to the received pulses.

As the timing diagram situated in FIG. 3 and representing the amplitude of the envelope of the signal rendered by the listening system illustrates, the listening system, after threshold then takes account of the pulses of durations and $\tau_2$. The database can identify transmitters whose characteristic pulse is of duration $\tau_1$, or else transmitters whose characteristic pulse is of duration $\tau_2$, or even transmitters whose characteristic pulse is a sequence comprising a first pulse of duration $\tau_1$ and a pulse of duration $\tau_2$. There is then confusion of the listening system in as much as it is not able to determine the real electronic signature of the radar.

Figure 4:
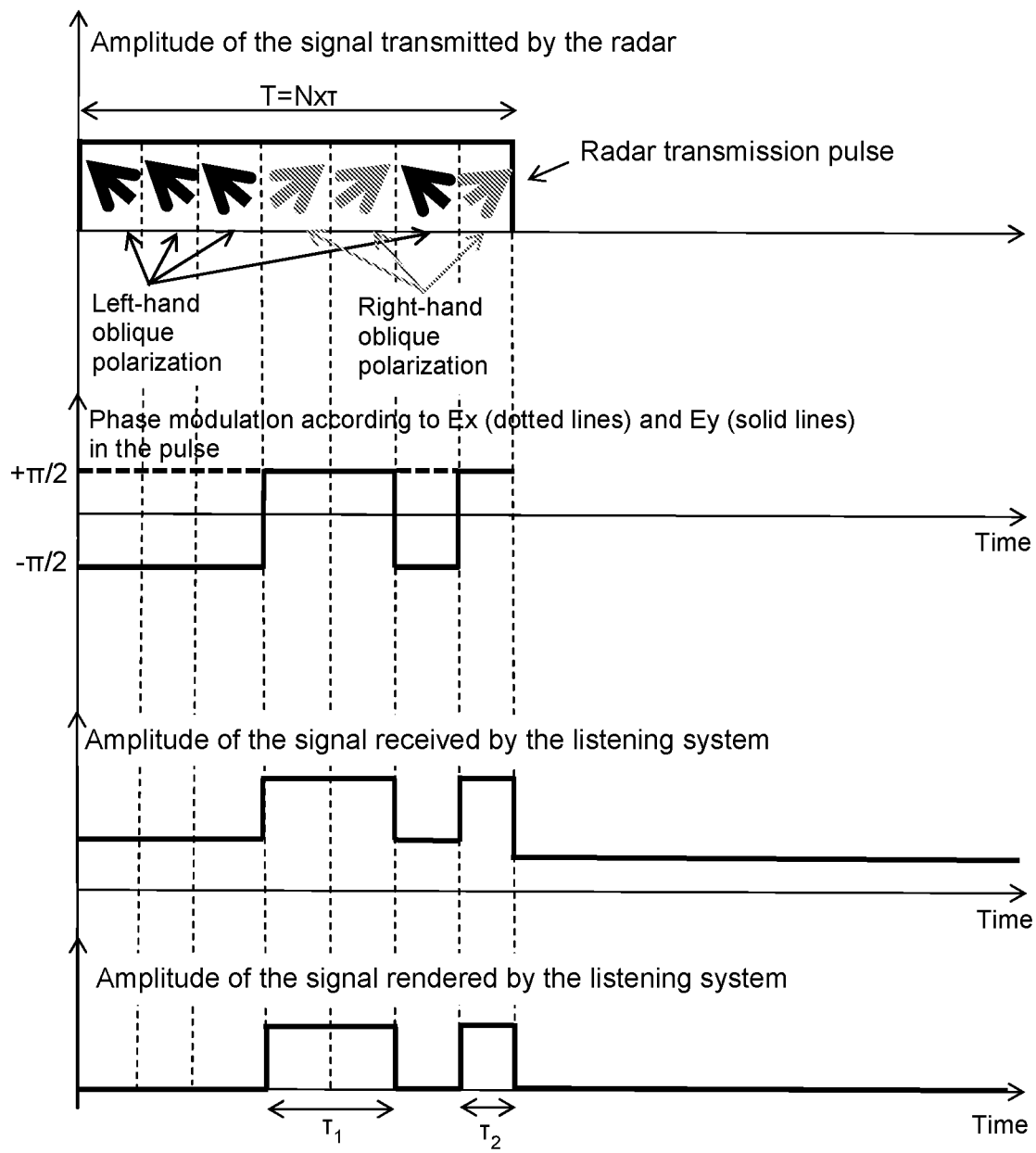
FIG. 4, four timing diagrams representing the amplitude of the envelope of the signal transmitted by the radar, the modulation of the phase of two orthogonal components of the electrical field, the amplitude of the envelope of the signal received by the listening device, and the amplitude of the envelope of the signal rendered by the listening device, when the method according to the invention alternates left-hand oblique polarization and right-hand oblique polarization.

FIG. 4 illustrates, in the same way as FIG. 3, the effect, on a listening system matched to a single oblique polarization, of a polarization switchover, between a left-hand oblique polarization and a right-hand oblique polarization. These two polarizations are said to be orthogonal to one another because their resulting electrical fields are oriented orthogonally.

The polarization modulation is performed by varying the phase modulation of the rectilinear components Ex and Ey, generated in the radiating element at the corresponding excitation ports. In left-hand oblique polarization, the rectilinear component Ex and the rectilinear component Ey are phase-shifted by $\pm\pi$, with the same amplitude. This phase-shift value can be obtained for example by applying a phase-shift of $+\pi/2$ to the rectilinear component Ex and a phase-shift of $-\pi/2$ to the rectilinear component Ey, or conversely, by applying a phase-shift of $-\pi/2$ to the rectilinear component Ex, and a phase-shift of $+\pi/2$ to the rectilinear component Ey. In right-hand oblique polarization, the rectilinear component Ex and the rectilinear component Ey are in phase, with the same amplitude. This can be obtained by applying the same phase-shift of $+\pi/2$ to both the rectilinear components.

Thus, to produce the transmission of a polarization modulation code, whether it involves switching over between a right-hand circular polarization and a left-hand circular polarization, or else switching over between a right-hand oblique polarization and a left-hand oblique polarization, it is sufficient to alternate the phase-shift between the vertical component Ey and the horizontal component Ex, between two fixed values, namely $+\pi/2$ and $-\pi/2$ in the circular polarization, or 0 and $\pm\pi$ in oblique polarization.

The polarization modulation code illustrated in FIGS. 3 and 4 is a seven-moment Barker code. The self-correlation function of the seven-moment Barker code reveals an amplitude peak equal to 7 when the correlator is centred. Outside of the peak, the coefficients of the self-correlation function alternate between 0 and $-1$. The calculation of correlation between the transmitted signal and the received signal is thus easily performed with a seven-moment Barker code. However, a Barker code having a different number of moments can be used, as can other modulation codes, such as the Gold code, the Gray code, or any other modulation code. The use of a high number of moments can cause the listening system to consider that the signal is a random signal. That can even cause the listening system to saturate.

Advantageously, the modulation code contains, to within one moment, as many moments for the orthogonal or opposite polarizations. Thus, in circular polarization, the modulation code contains as many moments with left-hand circular polarization as moments with right-hand circular polarization. In oblique polarization, the modulation code contains as many moments with left-hand oblique polarization as moments with right-hand oblique polarization. The radar does not in fact know a priori the manner in which the listening system is tuned, and the deception effect is therefore maximum.

According to a preferential embodiment of the invention, a plurality of pulses is generated and transmitted by the radar. The polarization code can then be modified from one pulse to the next. Preferably, the number of moments of same polarization is identical from one pulse to another, to within one moment. Thus, in Doppler mode, the amplitude of a signal reflected by a given target remains unchanged from recurrence to recurrence; there is therefore no Doppler widening linked to the modulation of the polarization.

Upon the transmission of a sequence of pulses, the modulation code can be temporally inverted from one pulse to the other. This technique is intrinsically more disruptive to the listening systems by modifying the periodicity of the signals rendered by the listening systems. It would also make it possible to reduce the second trace echoes, originating from the multiple echoes due to the recurrence of the pulses, which would be attenuated by the mismatching of the correlator used to the current recurrence with respect to the pulse transmitted on the preceding recurrence.

It should be noted that the method according to the invention is compatible with operation in an electronic scanning antenna. In this case the phase code corresponding to the polarization modulation in the pulse is superposed on the phase command applied to point the beam in a given direction. Thus, a distinct phase coefficient is applied to each radiating element in order to point the beam. The phase coefficient can be generated by the active radiofrequency transmission reception module. To this phase coefficient there is added, on each radiating element, a phase difference between the components Ex and Ey, in order to modulate the polarization.

In order to improve the distance resolution of a radar, it is also possible to superpose on the polarization modulation code a second code, identical on the components Ex and Ey, intended to produce a pulse compression. If there are N moments in the code, with a pulse duration initially equal to T, each pulse transmitted after compression a duration $\tau=T/N$. The pulse compression makes it possible to reduce the peak transmission power. The method according to the invention is therefore very well suited to integration on a monolithic microwave integrated circuit (MMIC), which does not operate with peak powers as high as tube radars.

The invention relates also to a transmission/reception device configured to implement the confusion method according to the invention.

According to a first embodiment, not represented in the figures, the transmission/reception device comprises a single reception channel matched to a rectilinear polarization corresponding to one of the two polarization components of the polarization of the transmitted signal, namely the component Ex or Ey. The rectilinear polarization corresponding to the component Ex is generally called horizontal polarization. The rectilinear polarization corresponding to the component Ey is generally called vertical polarization. Thus, whether the radar alternates left-hand and right-hand circular polarization, or it alternates left-hand and right-hand oblique polarization, the attenuation in the reception channel will never be less than −3 dB. The mismatching is the same for both polarizations for which there is a switchover on transmission. The transmission/reception device according to the first embodiment requires only one reception channel. There is no need to separate the components Ex and Ey on reception. The transmission/reception device is thus characterized by design simplicity.

Figure 5:
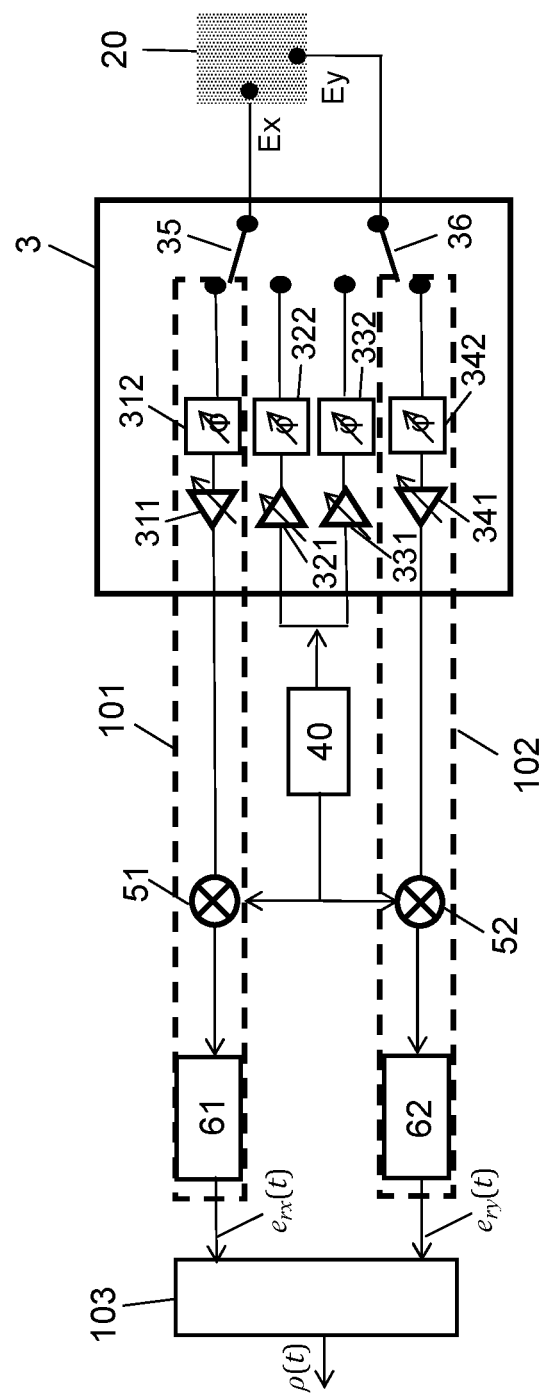
FIG. 5, a representation of the reception circuit of the transmission/reception device according to the invention, according to an embodiment using two reception channels.
Figure 6:
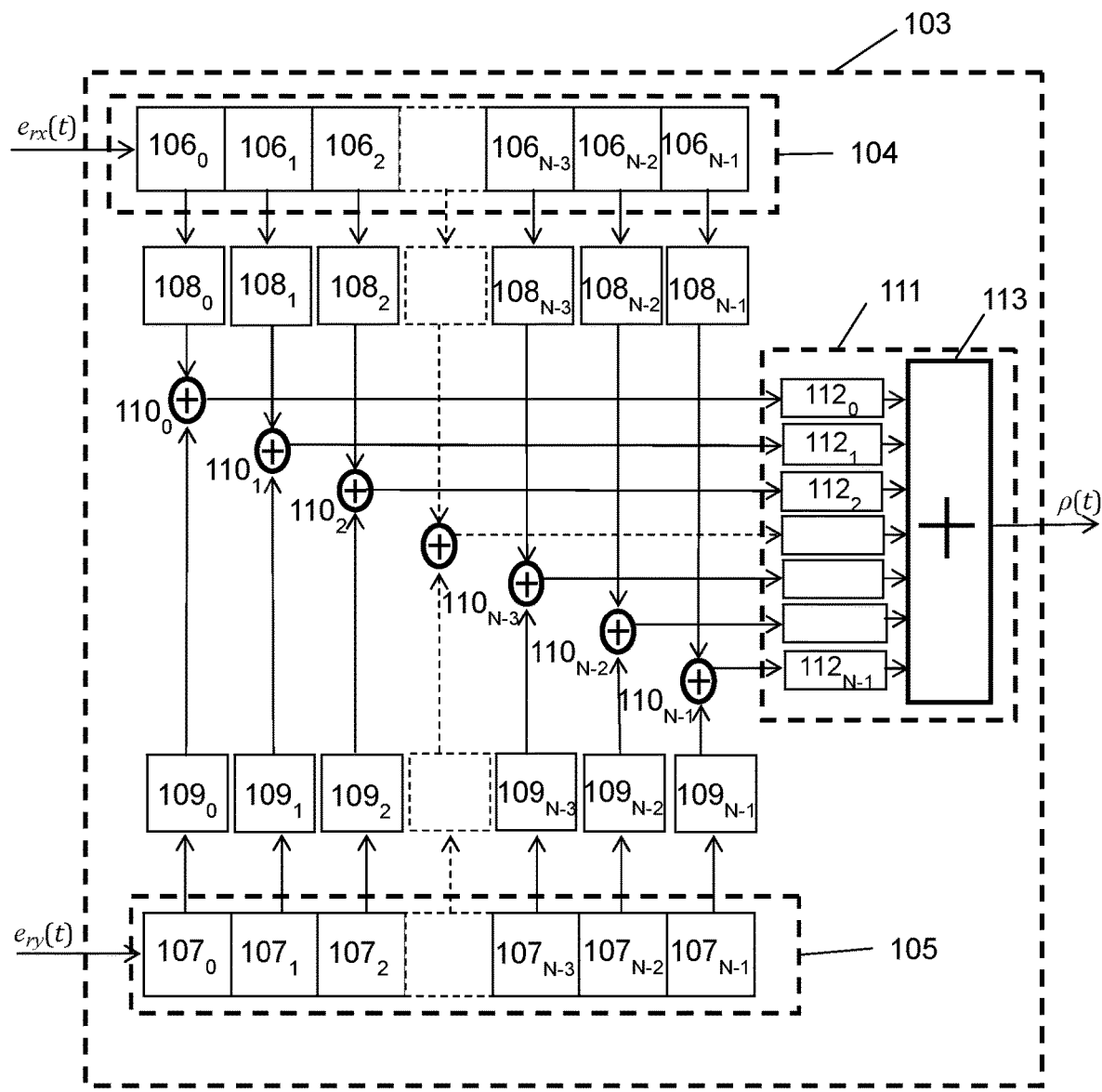
FIG. 6, a representation of the correlator employed in the transmission/reception device according to the invention, according to an embodiment using two reception channels.

According to a second embodiment, illustrated by FIGS. 5 and 6, the transmission/reception device comprises a first reception channel 101 matched to a first rectilinear polarization corresponding to a first polarization component Ex of the transmitted signal at the radiating element 20, and a second reception channel 102 matched to a second rectilinear polarization corresponding to a second polarization component Ey of the transmitted signal at the radiating element 20. According to the second embodiment, a filtering matched to the modulation code is performed.

The active radiofrequency transmission/reception module 30 ensures the control of amplitude and of phase of the transmission and reception RF signal. It comprises a switch 35 dedicated to the component Ex, and a switch 36 dedicated to the component Ey. Each of the switches 35, 36 makes it possible to switchover between transmission and reception.

For the modulation of the polarization in transmission, phase-shifting means make it possible (322, 332) to apply a relative phase-shift between the components Ex and Ey, and therefore to generate oblique or circular polarizations. The transmission phase-shifting means (322, 332) are, moreover, configured to alternate the phase-shift between the components Ex and Ey, in order to generate an alternation between left-hand circular polarization and right-hand circular polarization, or else an alternation between left-hand oblique polarization and right-hand oblique polarization. Reception phase-shifting means (312, 342) make it possible to apply a phase, identical according to the two components Ex and Ey, to the received signal in the context of an electronic scanning antenna. The transmission phase-shifting means (322, 332) make it possible also to apply an identical phase according to the two components Ex and Ey, in addition to the phase-shift linked to the polarization modulation. Amplification means that are variable in reception, for example low-noise amplifiers (311, 341), are disposed in each of the reception channels (101, 102). Amplification means that are variable in transmission (321, 331), for example high-power amplifiers, are disposed in the transmission channels. The amplification means variable in transmission (321, 331) can moreover be configured to apply, in transmission, different amplitudes to the components Ex and Ey; instead of radiating according to a circular polarization, the radiation would be performed with an elliptical polarization. The modulation would thus have two degrees of freedom, namely in phase and in amplitude, which would contribute to deceiving the listening system.

A local oscillator 40 generates a wave that is stable in frequency which is mixed with the reception signals according to each of the components Ex and Ey, to lower it to an intermediate frequency. The mixers (51, 52) combine the signals of the components Ex and Ey, possibly amplified and phase-shifted, with the wave produced by the local oscillator. The received signals are thus brought to an intermediate frequency, then digitized, by analogue-digital converters (61, 62).

On each reception channel, before being digitized by an analogue/digital converter (61, 62), the signal can be broken down into two orthogonal temporal channels, usually named I and Q. The breakdown makes it possible to gain 3 dB on the signal-to-noise ratio. This breakdown can also be performed after the analogue/digital coding step, by a digital phase amplitude detector, known by the person skilled in the art as digital PAD.

Finally, the signals from the two reception channels (101, 102) are digitized then transmitted to the correlator 103, common to the first reception channel 101 and to the second reception channel 102, and which ensures both a filtering matched to the modulation of the transmitted polarization and to the pulse.

The correlator 103 is illustrated in detail in FIG. 6. It is like a radar correlator with pulse compression matched to a phase code.

$e_{rx}(t)$ represents the component of the electrical field Ex received at the instant t. $e_{ry}(t)$ represents the component of the electrical field Ey received at the instant t.

The correlator 103 comprises a first shift register 104 composed of delay cells ($106_0, \ldots, 106_{N-1}$) applied to the first reception channel 101, and a second shift register 105 composed of delay cells ($107_0, \ldots, 107_{N-1}$) applied to the second reception channel 102. The number of delay cells of each shift register is equal to the number N of moments of the modulation code. Each of the delay cells applies a Laplace delay function, with a sampling pitch $\tau$.

A first series of N phase compensation cells ($108_0, \ldots, 108_{N-1}$) is coupled to the first shift register 104. Each phase compensation cell ($108_0, \ldots, 108_{N-1}$) of the first series is connected to a delay cell ($106_0, \ldots, 106_{N-1}$) of the first shift register (104), and configured to modulate a sample stored in the delay cell by a phase that is identical or conjugate relative to the phase of the moment of same rank of the modulation code applied to the first polarization component. A second series of N phase compensation cells ($109_0, \ldots, 109_{N-1}$) is coupled to the second shift register 105. Each phase compensation cell ($109_0, \ldots, 109_{N-1}$) of the second series is connected to a delay cell ($107_0, \ldots, 107_{N-1}$) of the second shift register (105), and configured to modulate a sample stored in the delay cell by a phase that is identical or conjugate relative to the phase of the moment of same rank of the modulation code applied to the second polarization component.

The selection of the modulation by a phase that is identical or conjugate relative to the phase of the moment of same rank of the modulation code applied to the first and to the second polarization components is performed so as to have, when the correlator is matched to the received signal, a series of N successive samples, corresponding to a resulting transmission/reception polarization that is unique and constant in the pulse, for example left-hand circular, right-hand circular, left-hand oblique or right-hand oblique.

The seven phase compensation cells modulate in reception the samples of the component of the electrical field Ex and of the component of the electrical field Ey so as to have a constant phase difference in the reception pulse equal to $-\pi/2$ for a right-hand circular polarization, or a constant phase difference in the reception pulse equal to $+\pi/2$ for a left-hand circular polarization. Likewise, the seven phase compensation cells modulate in reception the samples of the component of the electrical field Ex and of the component of the electrical field Ey so as to have a constantly zero phase difference in the reception pulse for a right-hand oblique polarization, or a constant phase difference in the reception pulse equal to $\pm\pi$ for a left-hand oblique polarization.

Thus, at the output of the phase compensation cells, the signals are put back in phase.

The correlator 103 also comprises a set of ($110_0, \ldots, 110_{N-1}$) summers. The summer $110_0$ adds the signals from the phase compensation cell $108_0$ and from the phase compensation cell $109_0$. More generally, each summer ($110_0, \ldots, 110_{N-1}$) is coupled to a phase compensation cell ($108_0, \ldots, 108_{N-1}$) of the first series and to a phase compensation cell ($109_0, \ldots, 109_{N-1}$) of the second series of same rank, and adds the signals from the cells to which it is coupled. "Same rank" is understood to mean same moment, lying between 0 and N-1, depending on the polarization modulation code A convolution circuit 111 is configured to convolute each of the signals from the summers ($110_0, \ldots, 110_{N-1}$) with a temporal replica of the pulse of the transmitted signal, which is a sinusoidal function with pulsing $\omega_0$ sampled on N points spaced apart by $\tau$ whose duration is equal to the length of the transmitted pulse. For that, the signals from the summers ($110_0, \ldots, 110_{N-1}$) are delayed, by cells ($112, \ldots, 112_{N-1}$) with a delay ($0, \tau, 2\tau, \ldots, (N-1)\tau$), corresponding to their instant of appearance in the shift registers (104, 105), then added in a common summer 113, to deduce therefrom the self-correlation function $\rho(t)$. A self-correlation peak between the transmission signal and the reception signal appears when the pulse is centred in the correlator 103. The latter operation corresponds to a digital Fourier transform, DFT, or fast Fourier transform, FFT.

Thus, the samples of received signals after summation of the two reception channels are identical to those which would have been received for a given polarization, without polarization modulation in transmission. The radar budget is unchanged.

By performing, in reception, a filtering matched to the transmitted polarization code, the radar processing is performed with little in the way of losses with respect to operation without polarization agility. This method is therefore particularly advantageous, since it makes it possible to deceive the listening systems, without affecting the performance levels of the radar itself.

The invention is particularly suited to an implementation by a radar of the method according to the invention. It could also be applied to a telecommunication method between a transmitter and a receiver: the transmitter modulates the polarization in transmission according to a predetermined code to which the receiver has access. On reception, the receiver performs a filtering matched to the modulation of the polarization. The listening systems, which do not have access to the modulation code, would consider as noise the signals for which their polarization is mismatched.

The invention claimed is:

1. A method for confusing the electronic signature of a signal transmitted by a radar, comprising the generation by the radar of a plurality of pulses, wherein the method comprises a step of modulation, in the pulse, of the polarization of the transmitted signal, according to two orthogonal or opposite polarizations, the modulation of the polarization being performed according to a predetermined modulation code, the modulation code being temporally inverted from one pulse to the next.

2. The method according to claim 1, wherein the modulation code alternately switches the polarization from left-hand circular to right-hand circular.

3. The method according to claim 1, wherein the modulation code alternately switches the polarization from left-hand oblique linear to right-hand oblique linear.

4. The method according to claim 1, wherein the modulation code comprises, to within one moment, as many moments for both orthogonal or opposite polarizations.

5. The method according to claim 1, wherein the modulation code is a seven-moment Barker code.

6. A transmission/reception device configured to implement the confusion method according to claim 1, the transmission/reception device comprising a single reception channel suited to a rectilinear polarization corresponding to one of the two polarization components of the polarization of the transmitted signal.

7. An antenna comprising a plurality of devices according to claim 6, the antenna being of the electronic scanning type.

8. A transmission/reception device configured to implement the confusion method according to claim 1, and comprising:
   a first reception channel suited to a first rectilinear polarization corresponding to a first polarization component (Ex) of the polarization of the transmitted signal; and
   a second reception channel suited to a second rectilinear polarization corresponding to a second polarization component (Ey) of the polarization of the transmitted signal;
   a correlator common to the first reception channel and to the second reception channel, and configured to perform a filtering suited to the modulation code.

9. The device according to claim 8, wherein the correlator comprises:
   a first shift register composed of delay cells ($106_0, \ldots, 106_{N-1}$) applied to the first reception channel, and a second shift register composed of delay cells ($107_0, \ldots, 107_{N-1}$) applied to the second reception channel, the number of delay cells of each shift register being equal to the number N of moments of the modulation code;

a first series of N phase compensation cells ($108_0, \ldots, 108_{N-1}$), each phase compensation cell ($108_0, \ldots, 108_{N-1}$) of the first series being connected to a delay cell ($106_0, \ldots, 106_{N-1}$) of the first shift register, and configured to modulate a sample stored in the delay cell by a phase that is identical or conjugate relative to the phase of the moment of same rank of the modulation code applied to the first polarization component;

a second series of N phase compensation cells ($109_0, \ldots, 109_{N-1}$), each phase compensation cell ($109_0, \ldots, 109_{N-1}$) of the second series being connected to a delay cell ($107_0, \ldots, 107_{N-1}$) of the second shift register, and configured to modulate a sample stored in the delay cell by a phase that is identical or conjugate relative to the phase of the moment of same rank of the modulation code applied to the second polarization component;

a set of summers ($110_0, \ldots, 110_{N-1}$), each summer ($110_0, \ldots, 110_{N-1}$) being coupled to a phase compensation cell ($108_0, \ldots, 108_{N-1}$) of the first series and to a phase compensation cell ($109_0, \ldots, 109_{N-1}$) of the second series of same rank;

a convolution circuit, configured to convolute a signal from the summers ($110_0, \ldots, 110_{N-1}$) with a temporal replica of the pulse of the transmitted signal.

\* \* \* \* \*